United States Patent
Won et al.

(10) Patent No.: US 10,111,143 B2
(45) Date of Patent: Oct. 23, 2018

(54) RESOURCE MANAGEMENT METHOD AND APPARATUS FOR USE IN WIRELESS COMMUNICATION SYSTEM

(71) Applicant: Samsung Electronics Co., Ltd., Gyeonggi-do (KR)

(72) Inventors: Sunghwan Won, Gyeonggi-do (KR); Songyean Cho, Seoul (KR); Sangsoo Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 14/251,481

(22) Filed: Apr. 11, 2014

(65) Prior Publication Data

US 2014/0308955 A1    Oct. 16, 2014

(30) Foreign Application Priority Data

| Apr. 11, 2013 | (KR) | .................. | 10-2013-0040090 |
| May 3, 2013 | (KR) | .................. | 10-2013-0050118 |
| Mar. 13, 2014 | (KR) | .................. | 10-2014-0029458 |

(51) Int. Cl.
*H04W 36/00* (2009.01)

(52) U.S. Cl.
CPC ........ *H04W 36/0066* (2013.01); *H04W 36/00* (2013.01)

(58) Field of Classification Search
CPC ................. H04L 5/0035; H04W 72/0413; H04W 72/00; H04W 24/10; H04W 48/16
USPC ........................ 455/436–444, 432.1–432.3
See application file for complete search history.

(56) References Cited

U.S. PATENT DOCUMENTS

| 2002/0151304 | A1 | 10/2002 | Hogan |
| 2005/0096051 | A1* | 5/2005 | Lee .................. H04W 36/0055 455/438 |
| 2007/0287419 | A1 | 12/2007 | Wang |
| 2009/0047960 | A1 | 2/2009 | Gunnarsson et al. |
| 2010/0273514 | A1 | 10/2010 | Koo et al. |
| 2011/0117916 | A1* | 5/2011 | Dahlen ............... H04W 48/02 455/436 |
| 2011/0261786 | A1 | 10/2011 | Bontu et al. |

(Continued)

FOREIGN PATENT DOCUMENTS

| CN | 1491519 A | 4/2004 |
| CN | 1671240 A | 9/2005 |

(Continued)

OTHER PUBLICATIONS

International Search Report dated Jul. 28, 2014 in connection with International Patent Application No. PCT/KR2014/003148, 4 pages.

(Continued)

*Primary Examiner* — Dung Hong

(57) ABSTRACT

A resource management method and apparatus allows or restricts use of some or all of the resources of entities of a wireless communication system. A radio resource management method of a radio access point includes receiving a measurement report from a terminal, selecting another radio access point for serving the terminal in cooperation with the serving radio access point based on the measurement report and a Handover Restriction List (HRL), and transmitting a request for serving the terminal to the selected another radio access point.

20 Claims, 12 Drawing Sheets

(56) References Cited

U.S. PATENT DOCUMENTS

| | | | |
|---|---|---|---|
| 2011/0294539 A1* | 12/2011 | Shin | H04W 48/18 |
| | | | 455/552.1 |
| 2012/0002643 A1 | 1/2012 | Chung et al. | |
| 2012/0264443 A1 | 10/2012 | Ng et al. | |
| 2013/0017826 A1* | 1/2013 | Bergquist | H04W 12/08 |
| | | | 455/426.1 |
| 2014/0094174 A1* | 4/2014 | Diachina | H04W 36/14 |
| | | | 455/436 |
| 2014/0148165 A1* | 5/2014 | Serravalle | H04W 16/14 |
| | | | 455/436 |
| 2014/0211759 A1* | 7/2014 | Guo | H04W 76/34 |
| | | | 370/331 |
| 2014/0301369 A1 | 10/2014 | Kubota | |
| 2015/0036648 A1* | 2/2015 | Li | H04L 5/001 |
| | | | 370/329 |
| 2015/0327094 A1* | 11/2015 | Lee | H04W 76/27 |
| | | | 370/252 |

FOREIGN PATENT DOCUMENTS

| | | |
|---|---|---|
| JP | 2012-249132 | 12/2012 |
| JP | 2013-509737 | 3/2013 |
| WO | WO 2009/022976 A1 | 2/2009 |
| WO | WO 2009/132118 | 10/2009 |
| WO | WO 2010/075473 A2 | 7/2010 |
| WO | WO 2013/009248 | 1/2013 |
| WO | WO 2013/031791 A1 | 3/2013 |

OTHER PUBLICATIONS

Extended European Search Report issued for EP 14782574.9 dated Jan. 26, 2016, 10 pgs.

Catt, "RRM Related Issues of Dual Connectivity Technique", R2-130978, 3GPP TSG RAN WG2 Meeting #81bis, dated Apr. 5, 2013, 4 pgs.

Samsung, "On the Area Restriction Information in the eNB", R3-130618, 3GPP TSG-RAN WG3 Meeting #79bis, dated Apr. 6, 2013, 2 pgs.

Alcatel-Lucent, "Discussion on Dual Connectivity and Requirements", R2-130520, 3GPP TSG RAN WG2 Meeting #81, dated Jan. 18, 2013, 4 pgs.

Office Action dated Jul. 4, 2016 in connection with Japanese Application No. 2015-555935, 6 pages.

Broadcom Corporation, "Mobility for Dual Connectivity", 3GPP TSG RAN WG2 Meeting #81bix, R2-130990, Chicago, Illinois, Apr. 15-19, 2013, 6 pages.

Notification of First Office Action, State Intellectual Property Office of China, dated Nov. 29, 2017, regarding Application No. 201480006408.8, 17 pages.

Huawei, Hisilicon, "Analysis of inter-node signaling load for mobility mechanism in small cell deployment," 3GPP TSG-RAN WG2 Meeting #81bis, R2-131260, Chicago, USA, Apr. 15-19, 2013, 4 pages.

Communication from European Patent Office in a counterpart foreign application, "Communication pursuant to Article 94(3) EPC," Application No. EP 14 782 574.9, dated May 26, 2017, 8 pages.

* cited by examiner

RESOURCE MANAGEMENT METHOD AND APPARATUS FOR USE IN WIRELESS COMMUNICATION SYSTEM

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2013-0040090, filed on Apr. 11, 2013, Korean Patent Application No. 10-2013-0050118 filed May 3, 2013, and Korean Patent Application No. 10-2014-0029458 filed Mar. 13, 2014, which are hereby incorporated by reference for all purposes as if fully set forth herein.

TECHNICAL FIELD

The present disclosure relates to a resource management method and apparatus of a wireless communication system. In more particular, the present disclosure relates to a method and apparatus for allowing or restricting use of some or all of the resources of entities of the wireless communication system.

BACKGROUND

Mobile communication systems were developed to provide the subscribers with voice communication services on the move. With the rapid advance of technologies, the mobile communication systems have evolved to support high speed data communication services beyond the early voice-oriented services.

FIG. 1 is a diagram illustrating a general mobile communication system. Referring to FIG. 1, the mobile communication system includes a User Equipment (UE) 100, a Radio Access Network (RAN) 130, and a core network 140. The RAN 130 may include a few components and, among them, the component 120 which interacts with the UE 100 communicates with the UE 100 through a radio interface 110 and connects to other components of the wireless communication system through wired links. Examples of the RAN component 120 include evolved Node B (eNB), Node B (NB) or Radio Network Subsystem (RNS) including it, Base Transceiver Station (BTS) or Base Station Subsystem (BSS) including it, wireless access point, Home eNB, Home NB, Home eNB GateWay (GW), X2 GW, etc. For the convenience sake, these components or the RAN itself is referred to as radio access point in the following description.

With some exceptions, each of the radio access point 120 is comprised of at least one cell having a predetermined area, and the UE 100 is served by the corresponding radio access point within the cell area. Here, the cell denotes the cell of the general cellular system, and the radio access point 120 is the device of managing and controlling the respective cell but, in the present disclosure, the terms 'cell' and 'radio access point' are used interchangeably in the same meaning.

In the resource-constrained wireless communication, efficient resource management is one of the most significant issues. In the conventional technology, the information on the UE is retained in or passing only the serving radio access point 120 with some exceptional situation (e.g. right after handover; a radio access point A may have the information on the UE for a predetermined duration after the handover over of the UE from the radio access point A to the radio access point B). Accordingly, the resource management is performed in association with UE mobility management in the conventional technology. This means that there is no need of considering the resource management and the mobility management separately.

When the UE enters the connected state or stays in the connected state, it is possible to perform mobility management through location registration procedure or handover allowance determination. When the UE is in the idle state, UE may initiate mobility management.

If the UE attempts location registration procedure to the radio access point which allows for mobility (if there is no problem in other aspects), the location registration procedure is likely to be successful such that the core network provides the radio access point with the mobility management information. The radio access point is capable of making a handover decision based on this information and, in any case, the source radio access point may send mobility restriction information to the target radio access point. Examples of the mobility management information may include Handover Restriction List (HRL).

If the UE attempts location registration procedure to the radio access point which does not allow for mobility, this procedure is rejected. If the mobility is rejected for the reason of non-allowance of mobility, the message notifying the UE of the rejection may include the cause of the non-allowance of mobility. In this case, the UE may modify, generate, or delete mobility management information under the UE's management based on the cause information. The UE in the idle state is capable of performing mobility management based on the mobility management information.

According to the conventional mobility management-based resource management method (in the case that the information on a UE is retained in or passing one radio access point to which the UE has connected), a specific radio access point may be configured to do not receive the information on a specific UE.

A description is mad of the exemplary case of using the mobility management-based resource management method. The types of small radio access points may be more various than those of the large radio access points and thus there may be a difficulty to verify various types of small radio access points in every case. The unidentified small radio access points are in the state that their security and stability are not verified yet and thus the resource management for the unidentified small radio access points is made integrally with specific information configured for them. For example, a specific unidentified radio access point may be designated with location information restricted to a predetermined UE, e.g. UE carried by a government official, such that the UE of the government official cannot interact with the unidentified small radio access point.

Meanwhile, as the mobile data traffic demand grows, the resource utilization method is being advanced to fulfill the growing mobile data traffic demand. Recently, there is a big change in resource utilization method. Unlike the conventional technology in which one UE interacts with tone radio access point, the recent technology allows one UE to interact with two or more radio access points. In order accomplish this, cooperation at the radio access point level is required.

As an example, the $3^{rd}$ Generation Partnership Project (3GPP) is planning to deal with the items standardizing the specifications required for realizing the inter-eNB Carrier Aggregation (CA) and inter-eNB Coordinated Multi-Point transmission and reception (CoMP) as the official items of Release 12. Through the standardization of Release 12, the two technologies (inter-eNB CA and inter-eNB CoMP) are to be standardized.

In more detail, the inter-eNB CA is the technology capable of allowing one UE to interact with two or more eNBs using carriers of different frequency bands. In the inter-eNB CA, one Master eNB (MeNB) managing a Primary Cell (PCell) with which the UE interacts primarily and at least one Secondary eNB (SeNB) managing a Secondary Cell (SCell) exist. Since the SeNB (as well as MeNB) is capable of interacting with the UE, the information on the UE may be retained in or passing the SeNB. In the inter-eNB CA, it may be possible for the UE to interact with two or more eNBs using the carriers of overlapped frequency band as well as using the carriers of different frequency bands.

Meanwhile, the CoMP is the technology capable of allowing the eNBs to cooperate for interaction with one UE in order to mitigate the inter-eNB interference caused by using the two or more eNBs using overlapped frequency band. Since the multiple eNBs are capable of exchanging data with one UE in the inter-eNB CoMP like the inter-eNB CA, the information on the UE may be retained in or passing multiple eNBs.

In brief, the inter-eNB CA and inter-eNB CoMP have in common that the information on a UE may be retained in or passing multiple eNBs although some differences exist there between.

This makes it possible to expect that there is a need of change in resource management method depending on the change of resource utilization pattern. The present disclosure proposes a new resource management method.

SUMMARY

As described above, the change in resource utilization pattern causes the possibility that the information on a UE is retained in or passing two or more radio access points. However, since the conventional resource management method is designed based on the mobility management considering interaction with only one radio access point, there is a need of a new resource management method suitable for the UE capable of interacting with two or more radio access points.

In addition, the conventional mobility management-based resource management method is efficient for interaction with only one radio access point. In the case that one UE interacts with two or more radio access points, the resource management for the primary radio access point can be performed based on the mobility management but the resource management for secondary radio access points may not be performed only based on the mobility management.

Also, the conventional mobility management-based resource management method has a drawback in that the management is restricted to the resource of the radio access point, i.e. the radio resource management. As the components constituting the wireless communication system are diversified, it becomes necessary to manage the resources of other components as well as radio access points.

To address the above-discussed deficiencies, it is a primary object to provide a method and apparatus for managing the radio resources or other wireless communication system resources for use of the UE in the interaction with one or more radio access points with the participation of at least one of servers, UEs, radio access points, radio access network (RAN) control entities having the subscriber information. Examples of the RAN control entity may include Mobility Management Entity (MME) and Serving General Packet Radio Service (GPRS) Support Node (SGSN).

In accordance with an aspect of the present disclosure, a radio resource management method of a radio access point is provided. The radio resource management method includes receiving a measurement report from a terminal, selecting another radio access point for serving the terminal in cooperation with the serving radio access point based on the measurement report and a Handover Restriction List (HRL), and transmitting a request for serving the terminal to the selected another radio access point.

In accordance with another aspect of the present disclosure, a radio resource management method of a radio access point is provided. The radio resource management method includes receiving a request for serving a terminal from another radio access which serves the terminal currently in cooperation with the another radio access point, determining whether to serve the terminal based on a Handover Restriction List (HRL), and transmitting a response to the other radio access point depending on the determination result.

In accordance with another aspect of the present disclosure, a radio access point managing radio resource is provided. The radio access point includes a communication unit for transmitting and receiving data and a controller for controlling to select, when a measurement report is received from a terminal, another radio access point for serving the terminal in cooperation with the serving radio access point based on the measurement report and a Handover Restriction List (HRL) and to transmit a request for serving the terminal to the selected another radio access point.

In accordance with another aspect of the present disclosure, a radio access point managing radio resource is provided. The radio access point includes a communication unit for transmitting and receiving data and a controller for controlling to determine, when a request requesting for serving a terminal is received from another radio access which serves the terminal currently in cooperation with the another radio access point, whether to serve the terminal based on a Handover Restriction List (HRL) and to transmit a response to the other radio access point depending on the determination result.

In accordance with another aspect of the present disclosure, a resource management of a terminal in a wireless communication system includes receiving resource management information form a radio access point, storing the resource management information, controlling use of resource based on the stored resource management information, and transmits the resource management information or information generated by processing the resource management information to the radio access point.

In accordance with an aspect of the present disclosure, a terminal managing resource includes a communication unit which receives resource management information from a radio access point and transmits the resource management information or information acquired by processing the resource management information to the radio access point, a storage unit which store the received resource management information, a controller which controls use of resource based on the stored information, and a processor which processes the received resource management information.

In accordance with another aspect of the present disclosure, a radio resource management method of a Radio Access Network (RAN) control entity includes generating resource restriction information (Resource Restriction List; RRL) including information for managing the radio resource and transmitting the resource restriction information to the radio access point.

In accordance with another aspect of the present disclosure, a radio resource management method of a radio access point includes receiving resource restriction information (Resource Restriction List; RRL) including information for managing radio resource from a Radio Access Network (RAN) control entity and performing resource management for a terminal based on the resource restriction information.

In accordance with another aspect of the present disclosure, a radio resource management method of a terminal includes receiving resource restriction information (Resource Restriction List; RRL) including information for managing radio resource from a radio access point and performing resource management based on the resource restriction information.

In accordance with another aspect of the present disclosure, a Radio Access Network (RAN) control entity managing radio resource includes a communication unit which communicates data with the outside and a controller which generates resource restriction information (Resource Restriction List; RRL) including information for managing radio resource and controls the communication unit to transmit the resource restriction information to the radio access point.

In accordance with another aspect of the present disclosure, a radio access point managing radio resource includes a communication unit which receives resource restriction information (Resource Restriction List; RRL) including information for managing the radio resource from a Radio Access Network (RAN) control entity and a controller which perform resource management for the terminal based on the resource restriction information.

In accordance with still another aspect of the present disclosure, a terminal managing radio resource includes a communication unit which receives resource restriction information (Resource Restriction List; RRL) including information for managing the radio resource from the radio access point and a controller which perform resource management based on the resource restriction information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure.

Although the embodiments of the present disclosure are directed to the RAN abiding by the 3GPP standard Long Term Evolution (LTE) as core network and Evolved Packet Core (EPC), the subject matter of the present disclosure can be applied to other types of communication system having the similar technical background with slight operation without departing from the scope of the present disclosure, and this will be understood by those in the art of the present disclosure.

Figure 1:
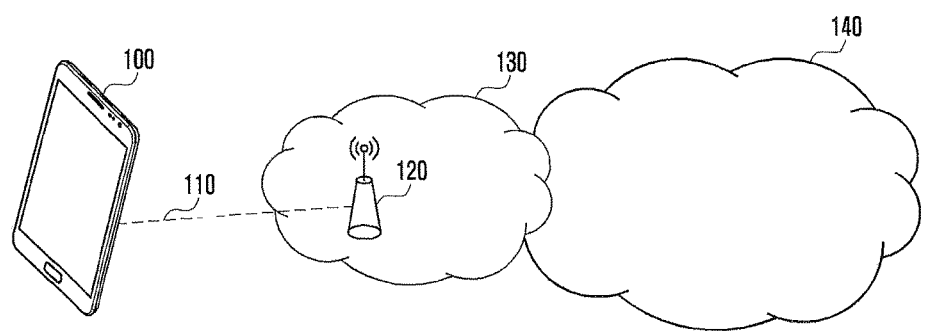
FIG. 1 illustrates a mobile communication system.
Figure 2:
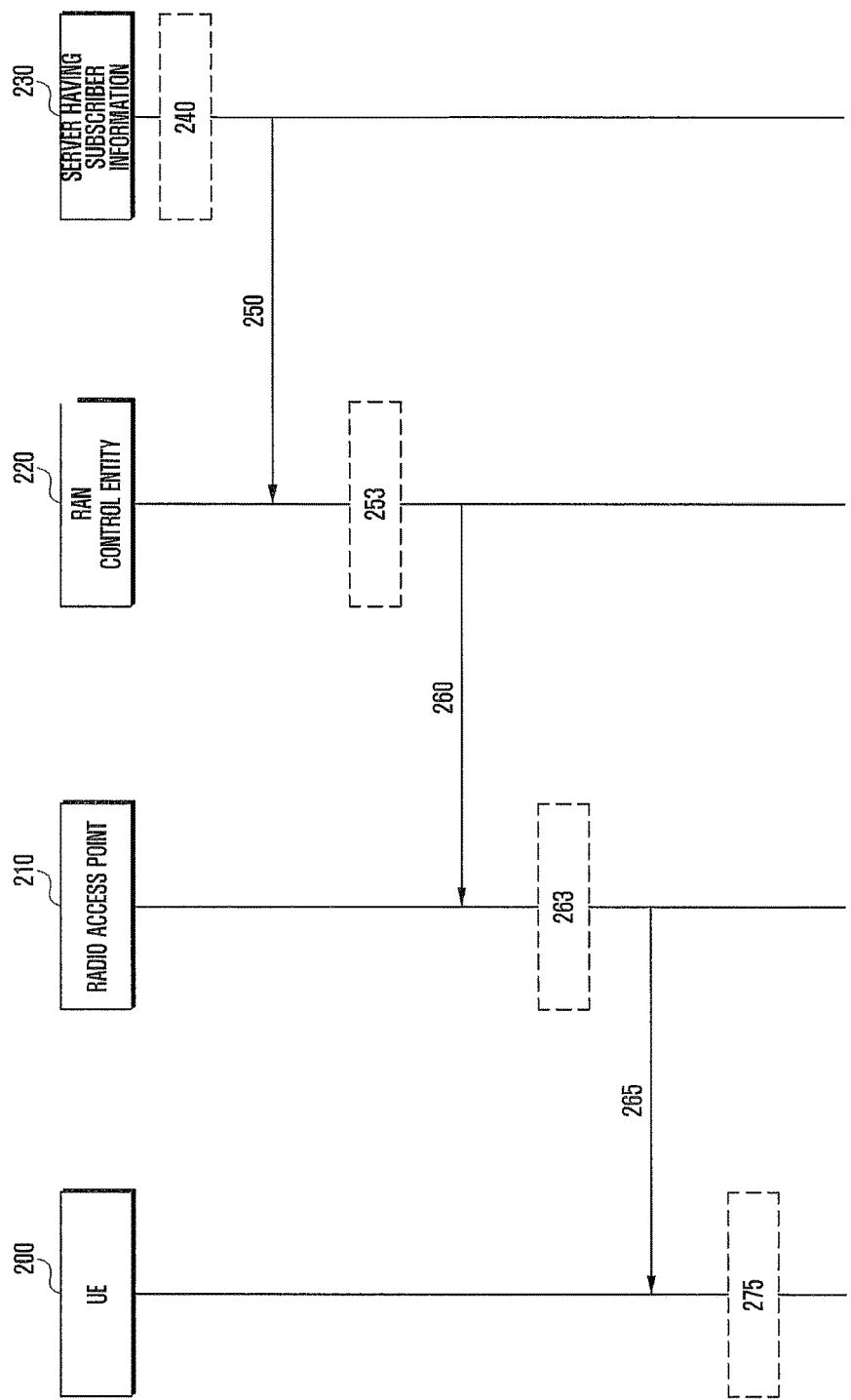
FIG. 2 is a signal flow diagram illustrating a radio resource management method according to an embodiment of the present disclosure.

FIG. 2 is a signal flow diagram illustrating a radio resource management method according to an embodiment of the present disclosure.

FIG. 2 shows the signals flows in which the RAN control entity 220 receives resource management information from the server 230 having the subscriber information and sends the resource management information or the information acquired by processing the resource management to at least one of the radio access point 210 and the UE 200.

According to this embodiment, at least one of the server 230, the RAN control entity 220, the radio access point 210, and the UE 200 may perform resource management based on the resource management information.

At operation 240, the server 230 having the subscriber information may receive the subscriber information input by the user, the subscriber information including the information for use in resource management. The information for use in resource management may be the legacy information or the information defined newly. Examples of the previously defined information may include access restriction data (Access-Restriction-Data).

At operation 250, the server 230 having the subscriber information may send the message including the information for use in resource management to the RAN control entity 220. The message may be the legacy Insert Subscriber Data Request message or a newly generate message. The information for use in resource management may include at least one of plan identifier, Tracking Area (TA) identifier, Location area (LA) identifier, Routing Area (RA) identifier, Radio Access Technology (RAT) name, frequency band, Shared Network Area (SNA) code, MME code, MME group identifier, LTE cell Global Identifier (CGI), CGI, Central Scheduling Unit (CSU) identifier, Enhanced Serving Mobile Location Center (E-SMLC) identifier, and Location Measurement Unit (LMU) identifier.

The above exemplified identifier, code, RAT name, and frequency band may be transmitted in the form of a bit stream or index. This makes it possible to reduce the data size so as to improve transmission efficiency. In the case that the data are transmitted in the form of a bit stream, individual bits may represent the specific identifier, code, RAT name, and frequency band. At this time, 1 may indicate the item to be restricted and 0 the item to be allowed (or vice versa). In the case that the data are transmitted in the form of an index, the indices indicating the identifier, code, RAT, and frequency band may be agreed between the transmitter and the receiver.

At operation 253, the RAN control entity 220 stores the information for use in resource management as it is or after being processed. Afterward, the rand control entity 220 may use the stored information in resource management. For example, the RAN control entity 220 may transmit one of accept and reject messages of Non-Access Stratum (NAS) protocol for resource management in the Location Registration procedure. For example, the resource management may be performed in such a way of accepting the Location Registration for the resource accepted in the stored information or rejecting the Location Registration for the resource rejected in the stored information.

At operation 260, the RAN control entity 220 sends the radio access point 210 the resource management information. The resource management information of this operation may be the information stored by the RAN control entity 220 at operation 253, the information acquired by processing the stored information, the information generated by the RAN control entity 220, or the information transmitted from another system entity, e.g. OAM, to the RAN control entity 220.

The resource management information that may be transmitted at operation 260 is referred to as Resource Restriction List (RRL) for convenience purpose. It is recognized that the resource management information may be referred to as another term but not RRL inevitably. Also, the RRL is not limited to including only the RRL but may include the information on the accepted resource.

The RRL may include the information for restricting or allowing at least one of the resources for use in Carrier Aggregation (CA) and Coordinated Multi-Point transmission and reception (CoMP). That is, the RRL may include the information of restricting data communication on the radio resource included in the RRL or allowing data communication only on the radio resource included in the RRL.

The RRL may be transmitted at least one of the S1AP message and RANAP message. In more detail, the RRL may be carried by at least one of INITIAL CONTEXT SETUP REQUEST message, HANDOVER REQUEST message, DOWNLINK NAS TRANSPORT message, PAGING message, RELOCATION REQUEST message, and COMMON ID message. As notice by the names of the messages capable of carrying the RRL, the RAN control entity 220 may transmit the RRL to the radio access point 210 in at least one of the Location Registration procedure, Service Request procedure, handover procedure, and when although not in any of these procedures the resource management information stored in the RAN control entity 200 is changed.

Table 1 exemplifies the HRL including RRL, and table 2 exemplifies a message when the RRL is included in IE at the same level of HRL.

TABLE 1

| IE/Group Name | Presence |
|---|---|
| Serving PLMN | M |
| ... | ... |
| Forbidden TAs for Resource Access | O |
| Forbidden inter RATs for Resource Access | O |
| ... | ... |

TABLE 2

| IE/Group Name | Presence | Criticality | Assigned Criticality |
|---|---|---|---|
| Message Type | M | YES | reject |
| ... | ... | ... | ... |
| Handover Restriction List | O | YES | ignore |
| ... | ... | ... | ... |
| Resource Restriction List | O | YES | ignore |

The RRL transmitted at operation 260 may be carried in at least one of the HRL as the legacy UE mobility management information, SNA Access Information, and NAS Protocol Data Unit (PDU) (see table 1) or may be the Information Element (IE) as the same level of the HRL or SNA Access Information. The RRL may list at least one of the restricted resource and allowed resource. The RRL may be expressed as an independent IE indicating the allowed resource and an independent IE indicating the restricted resource. Table 3 exemplifies the independent IE indicating the allowed resource and the independent IE indicating the restricted resource separately. Although the RRL (IEs indicating allowed resource and restricted resource) is at the same level as the HRL in table 3, it can be expressed as IE at a level different from HRL. The RRL may include at least one of the PLMN identifier, RAT name, TA identifier, LA identifier, RA identifier, frequency band, SNS code, MME code, MME group identifier, CGI for LTE, CGI, CSU identifier, E-SMLC identifier, and LMU identifier.

Table 3 exemplifies a message in with the RRL is split into at least to IEs.

TABLE 3

| IE/Group Name | Presence | Criticality | Assigned Criticality |
|---|---|---|---|
| Message Type | M | YES | reject |
| ... | ... | ... | ... |
| Handover Restriction List | O | YES | ignore |
| ... | ... | ... | ... |
| Allowed Resource List | O | YES | ignore |
| Restricted Resource List | O | YES | ignore |

The above exemplified identifier, code, RAT name, and frequency band may be notified in the form of a bit stream or an index. This makes it possible to reduce the data size so as to improve transmission efficiency. In the case that the data are transmitted in the form of a bit stream, individual bits may represent the specific identifier, code, RAT name, and frequency band. At this time, 1 may indicate the item to be restricted and 0 the item to be allowed (or vice versa). In the case that the data are transmitted in the form of an index, the indices indicating the identifier, code, RAT, and frequency band may be agreed between the transmitter and the receiver The RRL may be expressed as a simple indication. In the case that the RRL is expressed as the indication, the indication may represent the relationship with the RRL and HRL or SNA Access Information. For example, the indication may represent that the RRL is identical with the HRL or SNA Access Information.

At operation 263, the radio access point 210 may store the RRL. According to various embodiments, the radio access point 210 may perform resource management based on the stored RRL. The resource management may represent the resource management with the exception of the mobility management or the total resource management including mobility management.

In the wireless communication system according to the present disclosure, the relationship principle between the RRL and HRL may be configured. For example, the radio communication system may configure such that a set of the resource restricted by HRL becomes a subset of the set of the resource restricted by the RRL. Meanwhile, it is recognized that the set of the resource restricted by the RRL can be the subset of the set of the resource restricted by the HRL.

Examples of the resource management out of the mobility management may include carrier aggregation configuration, CoMP configuration, and RAN control entity selection. In the case of the RAN control entity selection as an example of resource management, at least one of the PLMN identifier, MME code, and MME group identifier can be sued. In more detail, if the RRL is configured to restrict specific MME code, the radio access point 210 may be configured to do not select the MME having the corresponding MME code. That is, the above information can be used in performing NAS Node Selection function (NNSF).

If it is stated that the RRL is identical with HRL or SNA Access Information, i.e. the information for use in resource management is identical with the information for use in the legacy mobility management (e.g. RRL is expressed as indication), the radio access point 210 may allow for access to the resource permitted for mobility for other purpose as well as mobility. In this case, the radio access point 210 may restrict the access to the resource restricted for mobility for other purposes. As analogized simply from the above description, it is recognized that the RRL may mean HRL through the embodiments of the present disclosure.

At operation 265, the radio access point 210 may send the UE 200 the resource management information. The resource management information may be the RRL or the information acquired by processing the RRL. The information may be carried in at least one of the DLInformationTransfer message, RRCConnectionReconfiguration message, and RRCConnectionReestablishment message.

At operation 275, the UE 200 may store the information received from the radio access point 210. The information may be stored in the Universal Subscriber Identity Module (USIM) and/or a storage unit of the UE 200.

The UE 200 may perform resource management based on the stored information. For example, the UE 200 in the idle state may use the stored information in selecting a PLMN or a radio access point to camp on.

If the resource management information is transmitted to the UE 200 using the DLInformationTransfer message, this is the case that the resource management information is transmitted through a NAS message between the RAN control entity 220 and the UE 200. Examples of the NAS message carrying the resource management information include Attach accept message, Attach reject message, Tracking area update accept message, Tracking area update reject message, Routing area update accept message, and Routing area update reject message.

The information which the UE 200 has received may be stored in USIM in the form of the Elementary File (EF). The information may be stored into the previously store EF or in a newly generated EF in the form of an appropriate resource management information. For example, if the information received from the radio access point 210 includes an access-restricted TA identifier, the UE 200 generates a new EF (e.g. EFFTAC) in the USIM for storing the TA identifier.

Figure 3:
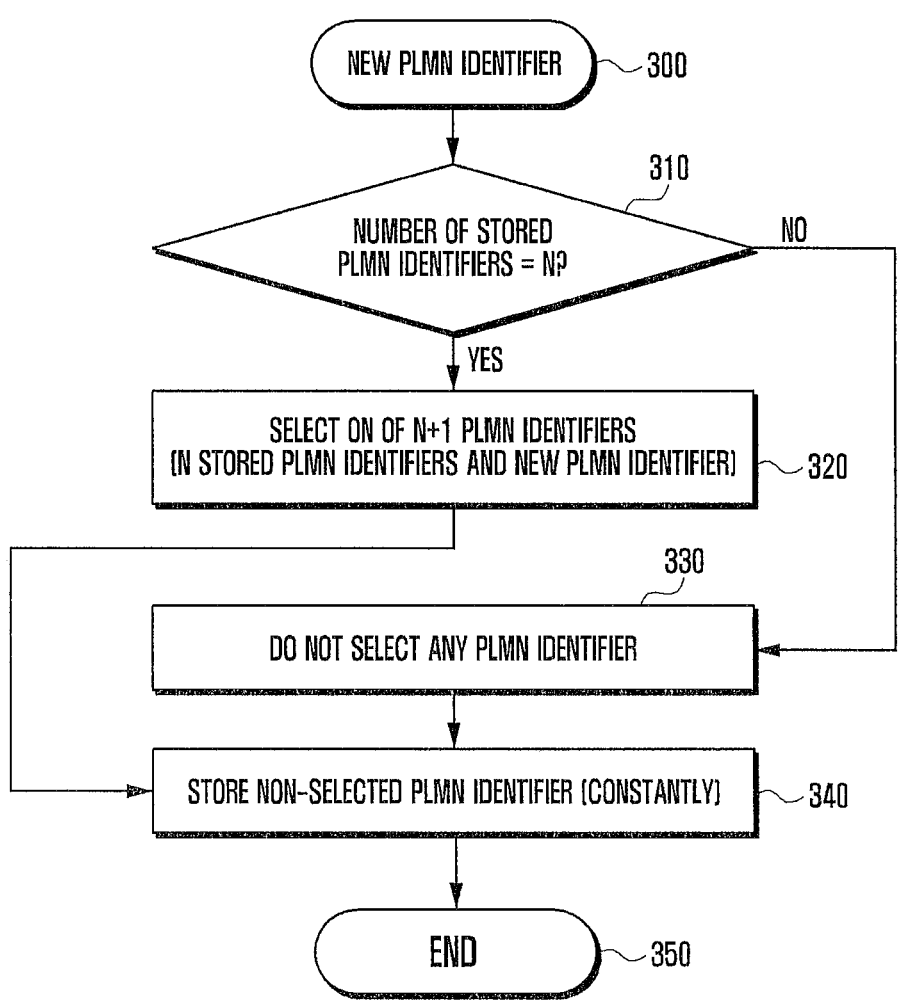
FIG. 3 is a flowchart illustrating a PLMN identifier storage procedure of the UE in a resource management method according to an embodiment of the present disclosure.

FIG. 3 is a flowchart illustrating a PLMN identifier storage procedure of the UE in a resource management method according to an embodiment of the present disclosure.

In detail, FIG. 3 is a flowchart illustrating the UE procedure for storing PLMN identifier.

According to this embodiment, if a new PLMN identifier is received in the stat the maximum number of PLMN identifiers is stored, the UE selects one of the stored PLMN identifiers in a method different from the conventional method and discards the selected PLMN identifier to store the newly received PLMN identifier. At this time, the PLMN identifier may be the restricted identifier or allowed identifier.

At operation 300, the UE 200 receives a, new PLMN identifier. The PLMN identifier may be carried in the NAS message transmitted by the RAN control entity 220, transmitted by the radio access point 210, or through other path.

At operation 310, the UE 200 determines whether the number of PLMN identifiers has reached maximum number of PLMN identifiers. Suppose that the maximum number of PLMN identifiers that can be stored in the UE 200 is n for convenience purpose.

If the number of stored PLMN identifiers has not reach n yet, the procedure goes to operation 330. Since the UE 200 has room for storing the newly received PLMN identifier, there is no need to select any PLMN identifier to be discarded in normal case.

If the number of stored PLMN identifiers has reached n already, the procedure goes to operation 320. The UE 100 selects one of the total (n+1) PLMN identifiers (n previously stored PLMN identifiers and newly received PLMN identifier). The selected PLMN identifier may be any of the non-protected PLMN identifier, PLMN identifier at the highest level among the previously stored non-protected PLMN identifiers, PLMN identifier at the lowest level among the previously stored non-protected PLMN identifiers, PLMN identifier at the highest level among the previously stored PLMN identifiers, and PLMN identifier at the lowest level among the previously stored PLMN identifier.

At operation 340 following operation 320 or 330, the PLMN identifiers not selected are stored constantly. At this time, the storage positions may be changed. If the newly received PLMN identifier is not selected, it may be stored at the position which has been occupied by the selected PLMN.

It is recognized that the method of this embodiment can be applied, as well as storing PLMN identifier, to storing at least one of RAT name, TA identifier, LA identifier, RA identifier, frequency band, SNA code, MME code, MME group identifier, LTE CCI, CCI, CSU identifier, E-SMLC identifier, and LMU identifier.

Figure 4:
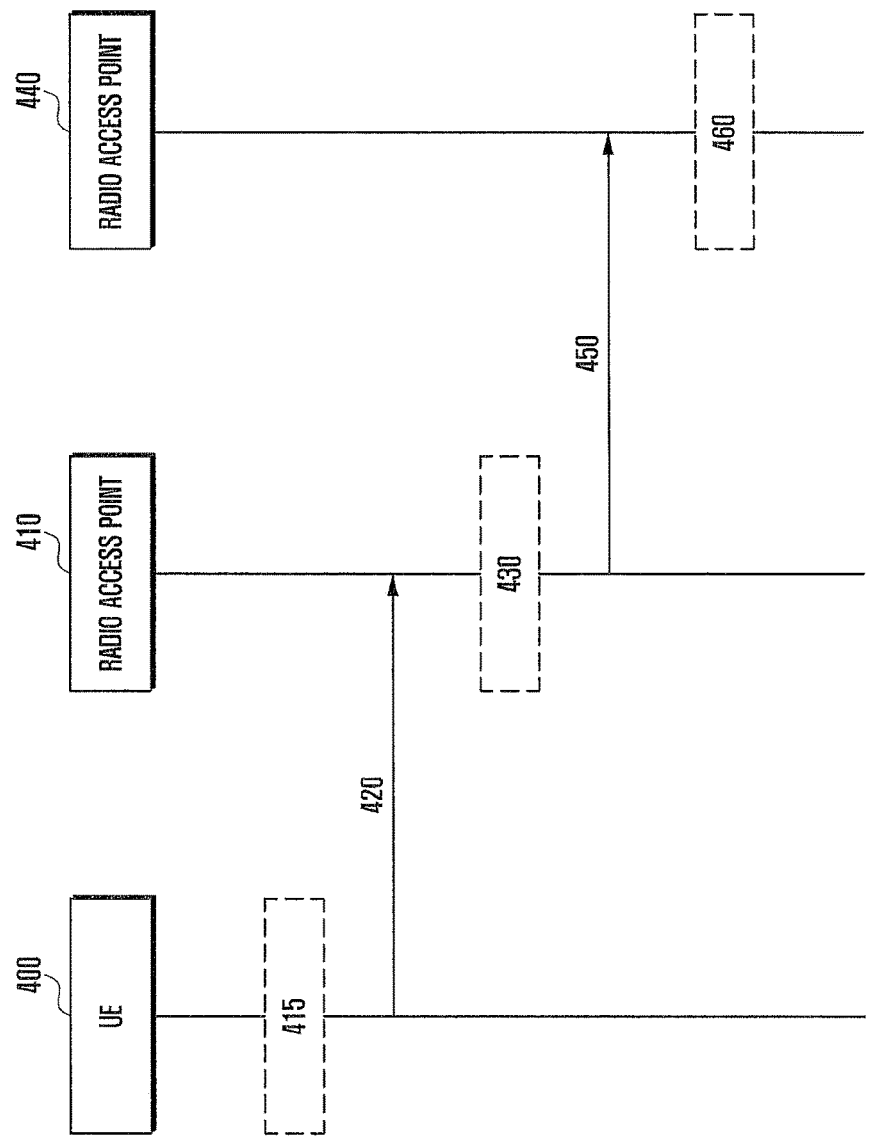
FIG. 4 is a signal flow diagram illustrating a radio resource management method according to an embodiment of the present disclosure.

FIG. 4 is a signal flow diagram illustrating a radio resource management method according to an embodiment of the present disclosure.

In detail, FIG. 4 is a signal flow diagram illustrating signal flows for transmitting resource management information from the UE 400 to the radio access point 410 and the radio access point 410 to another radio access point 440.

According to this embodiment, the UE 400 may send the radio access point 410 the information for use in resource management, and the radio access point 410 performs resource management based on this information. If necessary, the other radio access point 400 is capable of receiving the information for use in the resource management.

At operation 415, the UE 400 may receive the resource management information through the procedure of an embodiment of the present disclosure. The UE 400 also may receive the resource management information through other paths.

At operation 420, the UE 400 may send the radio access point 410 the resource management information. The resource management information may include at least one of PLMN identifier, RAT name, TA identifier, LA identifier, RA identifier, frequency band, SNA code, MME code, MME group identifier, LTE CGI, CGI, CSU identifier, E-SMLC identifier, and LMU identifier. The resource management information may be carried in at least one of RRCConnectionRequest message and RRCConnectionSetupComplete message.

The above exemplified identifier, code, RAT name, and frequency band may be transmitted in the form of a bit stream or index. This makes it possible to reduce the data size so as to improve transmission efficiency. In the case that the data are transmitted in the form of a bit stream, individual bits may represent the specific identifier, code, RAT name, and frequency band. At this time, 1 may indicate the item to be restricted and 0 the item to be allowed (or vice versa). In the case that the data are transmitted in the form of an index, the indices indicating the identifier, code, RAT, and frequency band may be agreed between the transmitter and the receiver.

At operation 430, the radio access point 410 may store the resource management information or the information acquired by processing it. Throughout the embodiments, the radio access point 410 may perform resource management based on the stored resource management information. The resource management may represent the resource management with the exception of the mobility management or the total resource management including mobility management.

Examples of the resource management out of the mobility management may include carrier aggregation configuration, CoMP configuration, and RAN control entity selection. In the case of the RAN control entity selection as an example of resource management, at least one of the PLMN identifier, MME code, and MME group identifier can be sued. In more detail, if the RRL is configured to restrict specific MME code, the radio access point 210 may be configured to do not select the MME having the corresponding MME code. That is, the above information can be used in performing NAS Node Selection function (NNSF).

At operation 450, the radio access point 410 may send another radio access point 440 the resource management information. The information may include at least one of PLMN identifier, RAT name, TA identifier, LA identifier, RA identifier, frequency band, SNA code, MME code, MME group identifier, LTE CGI, CGI, CSU identifier, E-SMLC identifier, and LMU identifier. This information is referred to as RRL for the convenience purpose. The RRL transmitted at the operation may be identical with the information which the radio access point 410 has received from the RAN control entity previously.

The above exemplified identifier, code, RAT name, and frequency band may be transmitted in the form of a bit stream or index. This makes it possible to reduce the data size so as to improve transmission efficiency. In the case that the data are transmitted in the form of a bit stream, individual bits may represent the specific identifier, code, RAT name, and frequency band. At this time, 1 may indicate the item to be restricted and 0 the item to be allowed (or vice versa). In the case that the data are transmitted in the form of an index, the indices indicating the identifier, code, RAT, and frequency band may be agreed between the transmitter and the receiver.

The information transmitted at operation 450 may be carrier in at least one of the INITIAL UE message and HANDOVER REQEUST message. Particularly when the radio access point 410 does not support NNSF, the information may be carried in the INITIAL UE message. Examples of the radio access points not supporting NNSF may include HeNB. The information may be carried in a new message which has never been defined in the conventional method. Examples of the new message may include a message transmitted in the SCell addition procedure and reconfiguration procedure.

At operation 460, the radio access point 440 may perform a part or all of the operation performed by the radio access point 310 at operation 430. Particularly when the radio access point 440 is the SCell for the UE 400, the radio access point 440 may participate in SCell configuration of the UE 400 afterward.

In detail, the SCell configuration is not determined by only the primary radio access point and, when the secondary radio access point participates in addition SCell configuration, the secondary radio access point 440 may perform additional SCell configuration using the resource management information received from the radio access point 410.

Figure 5:
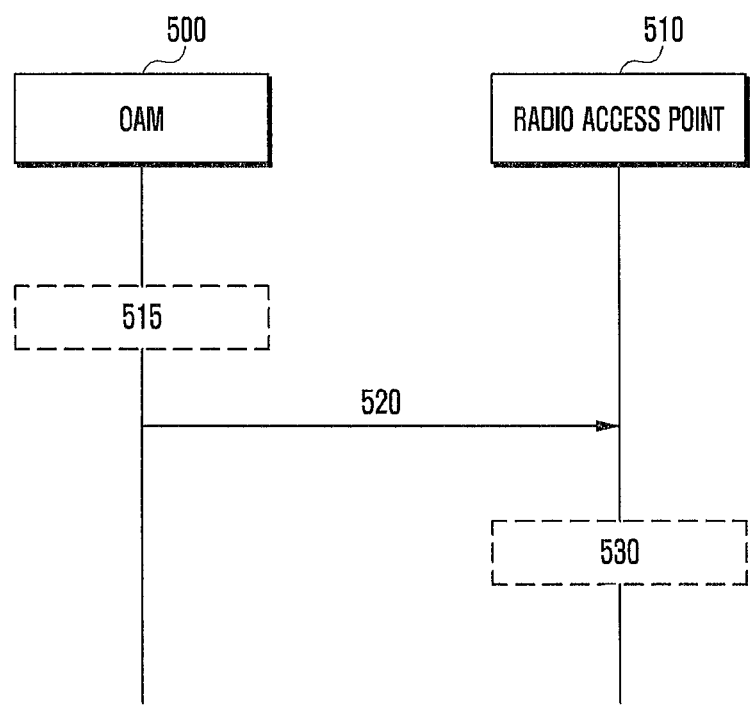
FIG. 5 is a signal flow diagram illustrating a radio resource management method according to another embodiment of the present disclosure.

FIG. 5 is a signal flow diagram illustrating a radio resource management method according to another embodiment of the present disclosure.

In detail, FIG. 5 is a diagram illustrating signal flows carrying radio management information from the OAM 500 to the radio access point 510.

At operation 515, the OAM 500 has the resource management information. Typically, the OAM stores the information by unit larger than UE, e.g. radio access point, TA, and PLMN. For example, the OAM may have the information of preventing the UE connecting to a certain PLMN from using a predetermined PLMN resource. A predetermined radio access point 510 may has the information of restricting the user of the resource of the radio access point associated with a predetermined PLMN. Of course, the OAM may have the information by UE. If the OAM has the information by UE, the information may be similar to the RRL according to an embodiment of the present disclosure.

At operation 520, the OAM 500 sends the radio access point 510 the resource management information. At this time, the resource management information may be the information retained at the OAM 500 at operation.

At operation 530, the radio access point 510 stores the received information and performs resource management based thereon. For example, if the receiving information is of preventing the UE connected to PLMN A from using the resource of PLMN B, the UE connected to the PLMN A is not allowed for mobility to the PLMN B and using the resource of PLMN B. This may be applied to the case where the PLMN B is an equivalent PLMN (ePLMN) of the PLMN A.

Figure 6:
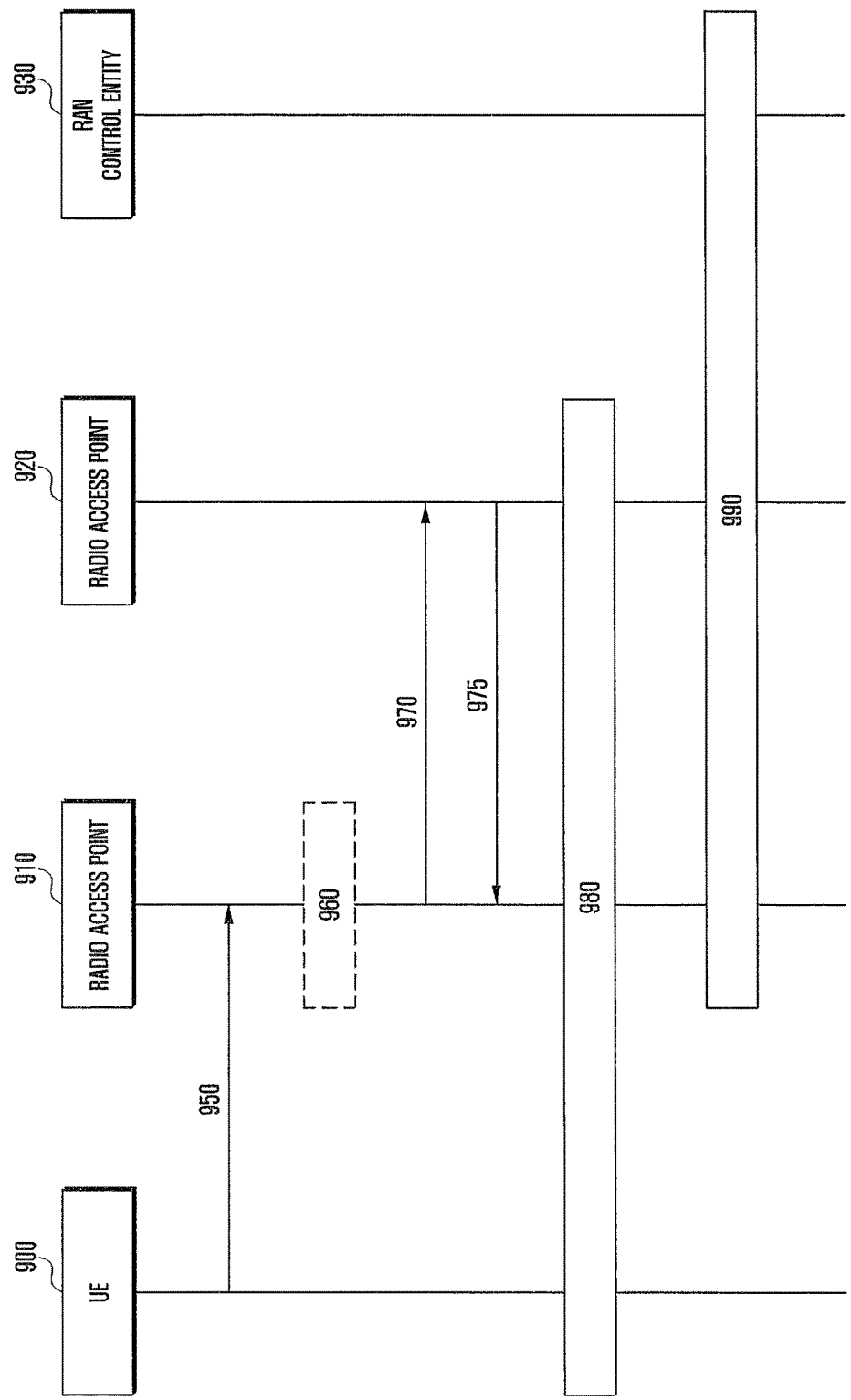
FIG. 6 is a signal flow diagram illustrating the radio resource management method according to another embodiment of the present disclosure.

FIG. 6 is a signal flow diagram illustrating the radio resource management method according to another embodiment of the present disclosure.

In detail, FIG. 6 is a diagram illustrating signal flows for adding the radio access point 920 interacting secondarily with the UE 900 based on the resource management capability of the primary radio access point 910.

At operation 950, the UE 900 may send the radio access point 901 a measurement report. The measurement report may be transmitted in the MeasurementReport message. The measurement report may exclude a part or all of the information on the resource restricted in the resource management information based on the resource management information which may be retained by the UE 900.

For example, the UE 900 may not transmit the all information on the radio resource restricted but only the identifier without reference signal strength measurement for the radio resource configured to be restricted. Examples of the reference signal strength measurement include RSRP-Range and RSRQ-Range. The identifier may be any of PhysCellId, CellGlobalIdEUTRA, TrackingAreaCode, and PLMN-Identity.

In addition, the UE 900 may include an indicator indicating the restricted resource restricted by the resource management information in the Measurement report. If the indicator is received, the radio access point 960 may control the UE 200 to do not use the radio resource indicated by the indicator.

At operation 960, the radio access point 910 may make a decision of adding a radio access point interacting secondarily with the UE 900. At this time, the decision may be made based on the measurement result of the UE 900. The secondary radio access point may be the radio access point establishing control plane and/or user plane with the UE 900 secondarily as well as SCell. In CoMP technology allowing a UE to establish the user plane with a plurality radio access points (Joint Processing, Joint Transmission, Dynamic Point Selection, and dual connectivity), the radio access points, with the exception of the radio access point serving the UE primarily, are to be the examples of secondary radio access points. An example of radio access point is eNB.

The radio access point 910 is capable of determining whether the radio access point 920 is available as a secondary radio access point of the UE 900 in consideration on whether the radio access point 920 fulfills at least one of the following conditions.

The radio access point 920 is not included in the resource restricted by at least one of RRL and HRL.

The radio access point 920 is included in the resource allowed by at least one of RRL and HRL.

The radio access point 920 is included in the resource allowed by the Subscriber Profile Identity (SPID) of the UE 900.

The radio access point 920 has the same feature as the primary radio access point 910.

The feature may represent at least one of same PLMN identifier, ePLMN identifier, same TA identifier, same RAT name, same MME code, same MME group identifier, and same Physical Cell Identity (PCI) range. For example, the radio access point 910 may perform resource management such that the radio access point having the same TA identifier as the radio access point 910 is configured as the SCell of the UE 900.

In various embodiments of the present disclosure, RRL and HRL may be used in the same meaning and thus RRL may indicate HRL.

In the case that the other radio access point 920 is determined available as a secondary radio access point of the UE 900, the radio access point 910 may requests the other radio access point 920 to operate as the secondary radio access point of the UE 900. In order to accomplish this, the radio access point 910 may send the other radio access point a request message. Examples of the request message may include HANDOVER REQUEST message and a newly defined message (e.g. SECONDARY CELL ADDITION REQUEST). The request message may include at least one of HRL, serving PLMN identifier, equivalent PLMN identifier, TA code, TA identifier, MME code, MME group identifier, PCI, and LTE CGI. In an embodiment, the HLR may include at least one of serving PLMN identifier, equivalent PLMN identifier, and restricted or allowed TA code as exemplified in table 1. The radio access point 920 may store a part or all of the information included in the message. The information 920 may be used in Radio Resource Management (RRM) of the radio access point 920 and access control. For example, if the radio access point 920 is a Closed Subscriber Group radio access point, the radio access point 920 may determine whether the corresponding UE 900 can use the resource of the radio access point using the serving PLMN. At this time, the message may further include the CSG identifier. In another example, the radio access point 920 may use the serving PLMN for load balancing between radio access points or rand control entities and/or public alarm message transmission.

If the request message is received, the radio access point 920 stores the information acquired from the request message for use in determining whether to interact with the UE 900.

If the request message includes any item which the radio access point 920 cannot support, the radio access point 920 may reject the request. For example, if the radio access point 920 does not support the TA identifier included in the request message, the radio access point 920 may reject the request message. For another example, if it is determined that the ePLMN identifier cannot be used, the radio access point 920 may reject the request message. In this way, although any information contained in the request message is not supportable by the radio access point 920, the request message may be rejected. In an embodiment, if the received request message includes no HRL, the radio access point 920 may determine that the access restriction is not applied to the UE 900.

At operation 975, the radio access point 920 may sends a response message in reply to the request. The response message may be any of an accept message and reject message. At this time, the radio access point 920 may include at least one of LTE CGI and PCI of the cell of the radio access point 920 to interact with the UE 900 in the response message. The reject message may include the cause of rejection. The radio access point 910 may consider the received cause information in mobility management and/or selecting the secondary radio access point or modifying neighbor relationship table. For example, the radio access point 910 may check the cell of the radio access point, e.g. No SCell attribute, in the neighbor relationship table based on the received cause information. In the present disclosure, if a cell is checked with No SCell attribute, this means the cell is no used as SCell.

The radio access point 920 may designate a cell different from the cell which the radio access point 910 has recommended (cell identified with the cell identifier transmitted at operation 970) as the secondary cell of the UE 900. In this case, the cell identifier of the radio access point 920 which is transmitted at operation 975 may differ from the cell identifier transmitted at operation 970. This operation is useful for recommending another cell when the cell of the radio access point 920 is overloaded.

At operation 980, if the response message is the accept message, the radio access points 910 and 920 and the UE 900 may perform the procedure of adding the radio access point 920 as a secondary radio access point. In this procedure, at least one of the radio access points 910 and 920 may send the UE 900 the RRCConnectionReconfiguration message to notify that the radio access point 920 is added as the secondary radio access point. The UE 900 replies and performs random access procedure with the radio access point 920.

At operation 990, at least one of the radio access points 910 and 920 may notify the RAN control entity 930 of the addition of the radio access point 920 as the secondary radio access point. The RAN control entity 930 may send at least one of the radio access points 910 and 920 the RRL.

At this time, if the radio access point 910 is intended to add or has added the radio access point not allowed in RRL as SCell, the response message may be the reject: or failure message.

If the response message is the reject message, the response message may be HANDOVER PREPARATION FAILURE message. In this case, the response message may include the information on the cause of the reject or failure and wrong data information.

The above description is an exemplary resource management method of the RAN control entity 930.

In the above embodiment, the radio access points 910 and 920 may be referred to as source and target eNBs, respectively.

Figure 7:
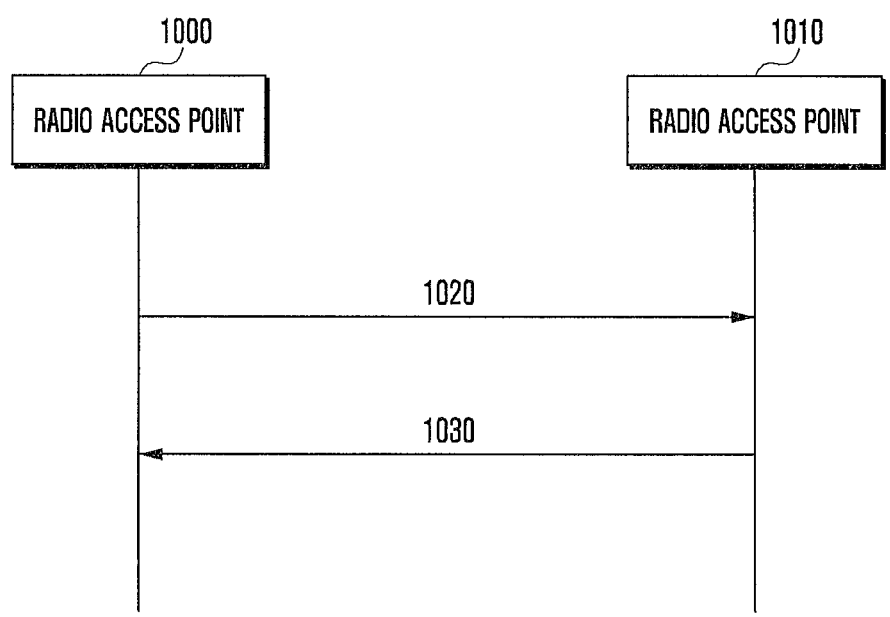
FIG. 7 is a signal flow diagram illustrating the radio resource management method according to another embodiment of the present disclosure.

FIG. 7 is a signal flow diagram illustrating the radio resource management method according to another embodiment of the present disclosure.

According to this embodiment, the radio access points 1000 and 1010 may notify whether the peer radio access point can be used as a secondary radio access point with each other through an interface there between. Examples of the interface may include X2AP and NEAP. According to this embodiment, the message exchanged through the X2AP or NBAP may include the information useful between the radio access points 1000 and 1010 and is advantageous in performing radio resource management with the addition of simple information.

At operation 1020, the radio access point 1000 may send the radio access point 1010 the information notifying whether the corresponding radio access point can be sued as a secondary radio access point. This information may indicate that the information sender can be the secondary radio access point of the information receiver or the information receiver can be the secondary radio access point of the information sender. By taking notice that the radio access point may mean the cell, it is recognized that the information may be the information on the radio resource at a level lower than that of eNB.

The information may be expressed in the form of an indicator. The information also may be transmitted using at least one of the X2 SETUP REQUEST message and ENB CONFIGURATION UPDATE message.

The radio access point 1000 may configure the information in consideration of at least one of PLMN identifier, ePLMN identifier, TA code, TA identifier, RAT name, HRL, and RRL of the radio access point 1010.

At operation 1030, the radio access point 1010 may send the radio access point 1000 the information on whether the radio access point can be used secondarily. The information transmitted at this operation may be similar to the information transmitted at operation 1020. The information may be transmitted in one of the X2 SETUP RESPONSE and ENB CONFIGURATION UPDATE ACKNOWLEDGE messages.

If a rule of secondary use of radio access point has been determined such that the radio access point 100 can(not) use the radio access point 1010 as the secondary radio access point the radio access point also can(not) use the radio access point 1000 as the secondary radio access point, one of the operations 1020 and 1030 for transmitting the information may be omitted.

Figure 8:
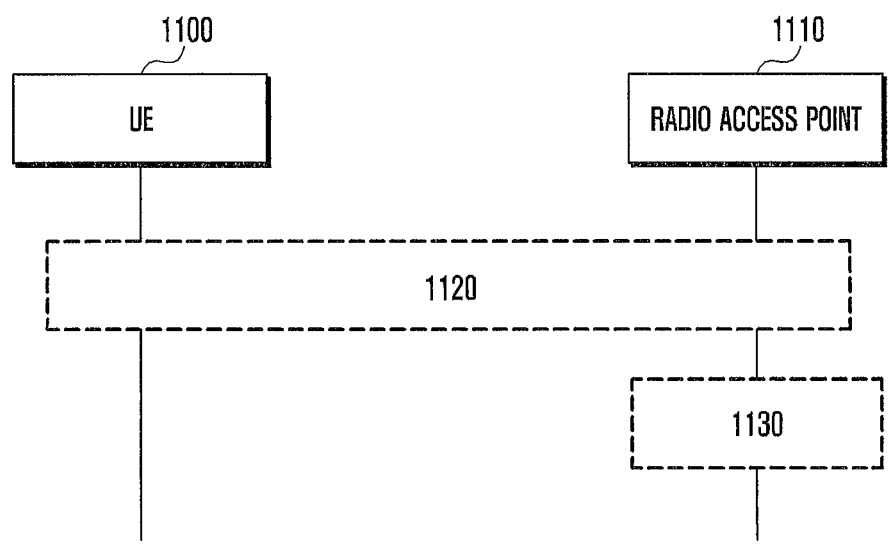
FIG. 8 is a signal flow diagram illustrating the radio resource management method according to another embodiment of the present disclosure.

FIG. 8 is a signal flow diagram illustrating the radio resource management method according to another embodiment of the present disclosure.

According to this embodiment, the radio access point 1110 may manage the radio resource in such a way of configuring Automatic Neighbor Relation using the information received from the UE 1100 and/or other radio access point.

The radio access point 1110 may have ANR function. ANR is capable of allowing the radio access point 1110 to manage the Neighbor Relation Table (NRT). The radio access point 1110 may add the information on the use of secondary radio access point to the NRT. For example, the radio access point 1110 may add items such and No SCell to the NRT such that the cell for which No SCell item is marked is not selected as secondary radio access point.

Table 4 exemplifies the Neighbor Relation Table (NRT) managed by the radio access point 1110 when the No SCell item is added to NRT. Table 4 is directed to the case when a new item is added to the NRT.

TABLE 4

| Neighbor cell Relation | Target Cell identifier | ... | No SCell |
|---|---|---|---|
| 1 | TCI#1 | ... | ✓ |
| 2 | TCI#2 | ... |  |
| 3 | TCI#3 | ... | ✓ |
| ... | ... | ... | ... |

At operation 1120, the radio access point 1110 receives the information on the neighbor radio access point from the UE 1100 and, if the corresponding neighbor radio access point is not known yet, requests the UE 1110 for additional information thereon.

At operation 1120, the radio access point 1110 may edit the NRT appropriately. The radio access point 1110 may edit the NRT in consideration of at least one of the PLMN identifier, ePLMN identifier, TA code, TA identifier, RAT identifier, MME code, MME group identifier, Physical Cell Identifier (PCI) range, HRL, and RRL in association with the radio access point corresponding to the provided information. For example, the radio access point 1110 may mark the No SCell item of the cell belonging to the restricted region in the HRL. As described in one of the embodiments, whether to mark the No SCell item is determined through information exchange with other radio access point or based on the information configured by the OAM.

Figure 12:
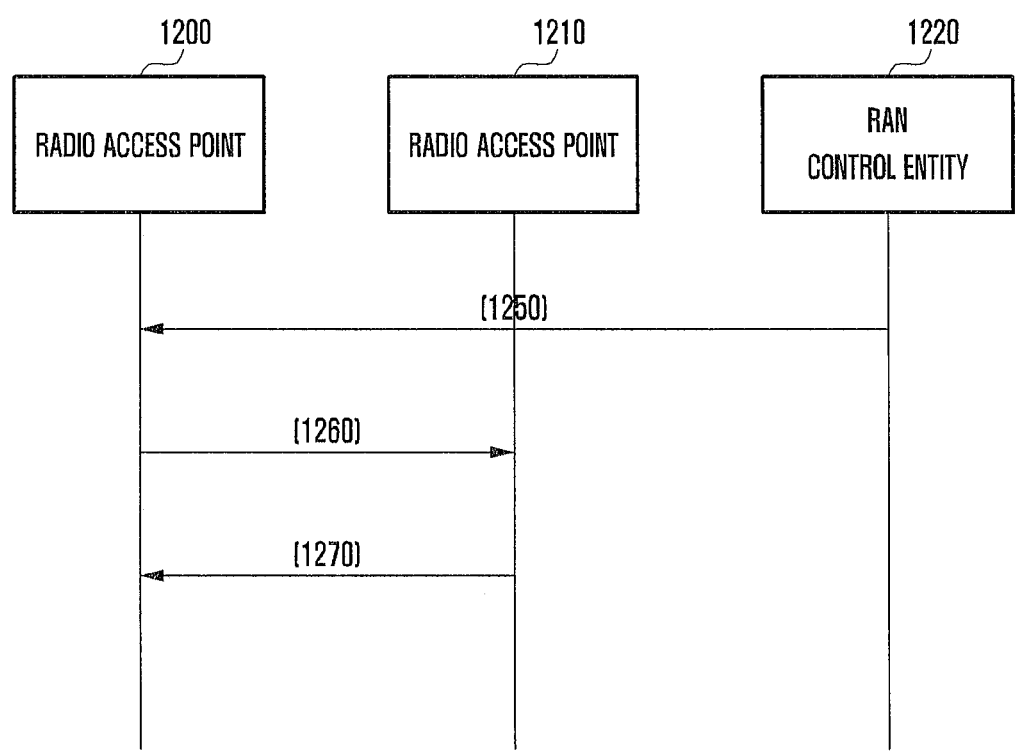
FIG. 12 is a signal flow diagram illustrating the radio resource management method according to still another embodiment of the present disclosure.

FIG. 12 is a signal flow diagram illustrating the radio resource management method according to still another embodiment of the present disclosure.

According to this embodiment, if new resource management information for the UE served primarily by the radio access point 1200 is received, radio access point 1200 may change the configuration to the radio access point 1210 serving the UE secondarily based on the new resource management information.

At operation 1250, the radio access point 1200 may receive the resource management information for the UE served primarily by the cell of the radio access point 120. Here, the resource management information may be HRL. Although FIG. 12 is directed to the case where the radio access point 1200 receives the resource management information from the RAN control entity 1220, the resource management information may be received from other network entity (e.g. OAM and another radio access point). Examples of the message carrying the resource management information include S1: INITIAL CONTEXT SETUP REQUEST message, S1: HANDOVER REQUEST message, S1: DOWNLINK NAS TRANSPORT message, and X2: HANDOVER REQUEST message. The radio access point 1200 may store the resource management information. In the case that the resource management information is present already, the radio access point 1200 replaces the old resource management information with the newly received resource management information.

If the received resource management information triggers change in the roaming and area restricting mechanism of the radio access point 1200, it may be necessary to release the radio access point 1210 serving the UE secondarily. For example, if the cell of the secondary radio access point 1210 of the UE which has been included in the area allowed to the UE is not included in the area allowed to the UE any longer as a result of checking the resource management information for the UE which has received newly from the radio access point 1200 serving the UE primarily, it is may be necessary to release connection between the radio access point 1210 and the UE.

At operation 1260, the radio access point 1200 may send a message requesting or commanding the radio access point belonging to the area which is not allowed any longer to release the function as SCell. This message may be referred to as SCELL RELEASE REQUEST or SCELL RELEASE COMMAND. This message may include the cause of release. The cause may be the roaming and area restriction. The radio access point 1210 may notify the radio access point 1200 that the release is successful at operation 1270.

In various embodiments of the present disclosure, the radio access point 1200 may send the UE a message notifying of or configuring the stop of serving the UE secondarily any more. The message may be the RRCConnectionReconfiguration message. The UE may perform SCell release to the cell of the radio access point 1210 and send a response message (e.g. RRCConnectionReconfigurationComplete message).

Figure 9:
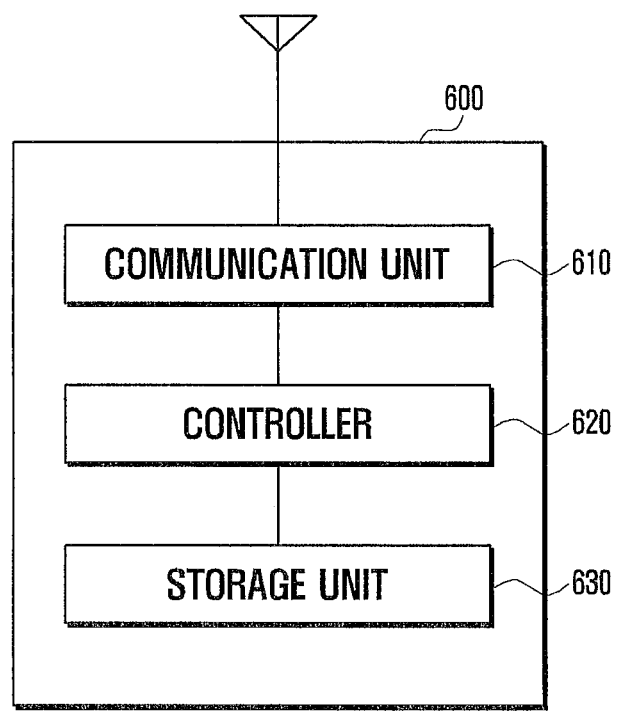
FIG. 9 illustrates a block diagram of the RAN control entity according to an embodiment of the present disclosure.

FIG. 9 is a block diagram illustrating a configuration of the RAN control entity according to an embodiment of the present disclosure.

Referring to FIG. 9, the RAN control entity 600 according to an embodiment of the present disclosure includes a communication unit 610, a controller 620, and a storage unit 630.

The communication unit 610 is responsible for data communication with the outside.

The controller 620 generates the resource restriction information (Resource Restriction List; RRL) including the information for use in radio resource and control the communication unit 610 to transmit the resource restriction information to the radio access point according to an embodiment of the present disclosure. At this time, the resource restriction information may include the information for restricting or allowing at least one of the resources for use in Carrier Aggregation (CA) and Coordinated Multi-Point transmission and reception (CoMP). The resource restriction information may include at least one of PLMN identifier, Radio Access Technology (RAT) name, Tracking Area (TA) identifier, Routing Area (RA) identifier, frequency band, Shared Network Area (SNA) code, MME code, MME group identifier, Cell Global Identifier (CGI), Central Scheduling Unit (CSU) identifier, Enhanced Serving Mobile Location Center (E-SMLC) identifier, and Location Measurement Unit (LMU) identifier.

The controller 620 may store the received RRL or the information generated by processing the RRL in the storage unit 630.

The controller 620 may control the communication unit 610 to transmit the received RRL or the information generated by processing the RRL.

The controller 620 may control the components of the RAN control entity 600 to perform the operations as described in the embodiments of the present disclosure.

Figure 10:
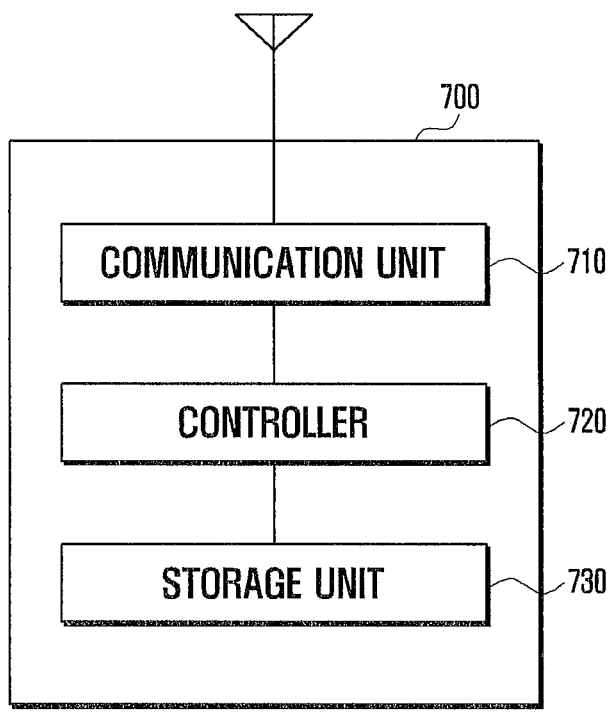
FIG. 10 illustrates a block diagram of the radio access point according to an embodiment of the present disclosure.

FIG. 10 is a block diagram illustrating a configuration of the radio access point according to an embodiment of the present disclosure.

Referring to FIG. 10, the radio access point 700 may include a communication unit 710, a controller 720, and a storage unit 730.

The communication unit 710 is responsible for data communication with the outside. The communication unit 710 may receive the resource restriction information (RRL) including the information for use in radio resource management from at least one of the RAN control entity and other radio access points.

The resource restriction information includes the information for restricting or allowing at least one of the resources for use in Carrier Aggregation (CA) and Coordinated Multi-Point transmission and reception (CoMP). The resource restriction information may also include at least one of PLMN identifier, Radio Access Technology (RAT) name, Tracking Area (TA) identifier, Routing Area (RA) identifier, frequency band, Shared Network Area (SNA) code, MME code, MME group identifier, Cell Global Identifier (CGI), Central Scheduling Unit (CSU) identifier, Enhanced Serving Mobile Location Center (E-SMLC) identifier, and Location Measurement Unit (LMU) identifier.

The controller 720 performs resource management for the UE based on the received resource restriction information. The controller 720 may perform resource management such that the UE does not use the resource indicated by the resource restriction information for data communication.

The controller 720 may store the received resource restriction information or the information generated by processing the resource restriction information in the storage unit 730.

The controller 720 may control the communication unit 710 to transmit the received resource restriction information or the information generated by processing the resource restriction information to another radio access point or the UE.

The controller 720 may control the components of the radio access points 700 to perform the operations as described in above embodiments of the present disclosure.

Figure 11:
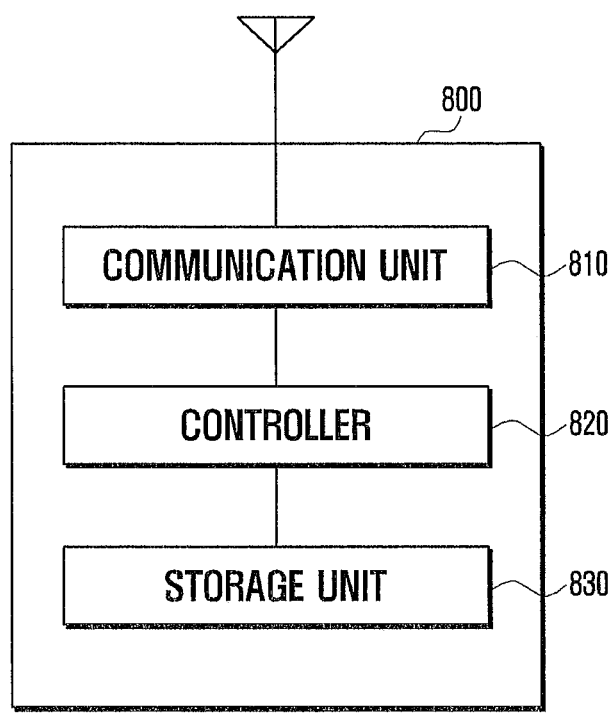
FIG. 11 illustrates a block diagram of the UE according to an embodiment of the present disclosure.

FIG. 11 is a block diagram illustrating a configuration of the UE according to an embodiment of the present disclosure.

Referring to FIG. 11, the UE 800 includes a communication unit 810, a controller 820, and a storage unit.

The communication unit 810 is responsible for communication with the outside. The communication unit 810 receives the resource restriction information (RRL) including the information for use in radio resource management from the radio access point. The resource restriction information may include the information for restricting or allowing at least one of the resources for use in Carrier Aggregation (CA) and Coordinated Multi-Point transmission and reception (CoMP). The resource restriction information may include at least one of PLMN identifier, Radio Access Technology (RAT) name, Tracking Area (TA) identifier, Routing Area (RA) identifier, frequency band, Shared Network Area (SNA) code, MME code, MME group identifier, Cell Global Identifier (CGI), Central Scheduling Unit (CSU) identifier, Enhanced Serving Mobile Location Center (E-SMLC) identifier, and Location Measurement Unit (LMU) identifier.

The communication unit 820 performs resource management of the UE using the received resource restriction information. In detail, the controller 820 may perform resource management such that the UE does not use the resource indicated by the resource restriction information for data communication. Particularly, the controller 820 may perform the resource management such that a part or all of the information on the resource indicated by the resource restriction information is not included in the measurement report.

The controller 820 may store the received resource restriction information or the information generated by processing the resource restriction information in the storage unit 830.

The controller 820 may control the communication unit 820 to transmit the received resource restriction information or the information acquired by processing the resource restriction information to the radio access point.

The controller 820 may control the components of the UE 800 to perform the operations as described in the above embodiments of the present disclosure.

In the above-described embodiments, individual operations may be performed or omitted selectively. Also, it is not inevitable for the operations to be performed in the order as described in the respective embodiments.

As described above, the resource management method and apparatus of the present disclosure is advantageous in managing the radio resource and other wireless communication system resource when the UE interacts with one or more radio access points.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a first base station in a wireless communication system, the method comprising:
   selecting a second base station based on access restriction information for a user equipment (UE);
   transmitting, to the selected second base station, a second base station addition request message, which includes a serving public land mobile network (PLMN) identifier, for requesting allocation of resources for dual connectivity of the UE; and
   receiving a response message in response to the second base station addition request message from the selected second base station,
   wherein the serving PLMN identifier is used for managing radio resources according to the dual connectivity by the second base station.

2. The method of claim 1, wherein the second base station addition request message comprises a Secondary evolved Node B (SeNB) ADDITION REQUEST message and the response message comprises a SeNB ADDITION ACKNOWLEDGE message.

3. The method of claim 1, wherein the access restriction information includes handover restriction list (HRL).

4. The method of claim 1, wherein the first base station comprises a Master evolved Node B (MeNB) and the second base station comprises a Secondary evolved Node B (SeNB).

5. The method of claim 1, further comprising:
   receiving a measurement report from the UE,
   wherein the second base station is selected in further consideration of the measurement report.

6. The method of claim 1, further comprising:
   editing, if the received response message is a reject message including cause of rejection, neighbor relation table (NRT) based on the cause of rejection.

7. A method by a second base station in a wireless communication system, the method comprising:
   receiving, from a first base station, a second base station addition request message, which includes a serving public land mobile network (PLMN) identifier, for requesting allocation of resources for dual connectivity of a user equipment (UE); and
   transmitting a response message in response to the second base station addition request message to the first base station,
   wherein the second base station is selected based on access restriction information for the UE, and wherein the serving PLMN identifier is used for managing radio resources according to the dual connectivity by the second base station.

8. The method of claim 7, wherein the second base station addition request message comprises a Secondary evolved Node B (SeNB) ADDITION REQUEST message and the response message comprises a SeNB ADDITION ACKNOWLEDGE message, and
wherein the access restriction information includes handover restriction list (HRL).

9. The method of claim 7, wherein the first base station comprises a Master evolved Node B (MeNB) and the second base station comprises a Secondary evolved Node B (SeNB).

10. The method of claim 7, wherein the response message comprises at least one serving PLMN identifier selected by the second base station and comprises load status corresponding to the at least one serving PLMN identifier.

11. A first base station in a wireless communication system, the first base station comprising:
a communication unit; and
a controller coupled with the communication unit and configured to control:
selecting a second base station based on access restriction information for a user equipment (UE);
transmitting, to the selected second base station, a second base station addition request message, which includes a serving public land mobile network (PLMN) identifier, for requesting allocation of resources for dual connectivity for the UE; and
receiving a response message in response to the second base station addition request message from the selected second base station,
wherein the serving PLMN identifier is used for managing radio resources according to the dual connectivity by the second base station.

12. The first base station of claim 11, wherein the second base station addition request message comprises a Secondary evolved Node B (SeNB) ADDITION REQUEST message and the response message comprises a SeNB ADDITION ACKNOWLEDGE message.

13. The first base station of claim 11, wherein the access restriction information includes handover restriction list (HRL).

14. The first base station of claim 11, wherein the first base station comprises a Master evolved Node B (MeNB) and the second base station comprises a Secondary evolved Node B (SeNB).

15. The first base station of claim 11, wherein the controller is further configured to control receiving a measurement report from the UE,
wherein the second base station is selected in further consideration of the measurement report.

16. The first base station of claim 11, wherein the controller is further configured to control editing neighbor relation table (NRT) based on cause of rejection if the received response message is a reject message including the cause of rejection.

17. A second base station in a wireless communication system, the second base station comprising:
a communication unit; and
a controller coupled with the communication unit and configured to control:
receiving, from a first base station, a second base station addition request message, which includes a serving public land mobile network (PLMN) identifier, for requesting allocation of resources for dual connectivity of an user equipment (UE); and
transmitting a response message in response to the second base station addition request message to the first base station,
wherein the second base station is selected based on access restriction information for the UE, and
wherein the serving PLMN identifier is used for managing radio resources according to the dual connectivity by the second base station.

18. The second base station of claim 17, wherein the second base station addition request message comprises a Secondary evolved Node B (SeNB) ADDITION REQUEST message and the response message comprises SeNB ADDITION ACKNOWLEDGE message, and
wherein the access restriction information includes handover restriction list (HRL).

19. The second base station of claim 17, wherein the first base station comprises a Master evolved Node B (MeNB) and the second base station comprises a Secondary evolved Node B (SeNB).

20. The second base station of claim 17, wherein the response message comprises at least one serving PLMN identifier selected by the second base station and comprises load status corresponding to the at least one serving PLMN identifier.

* * * * *